US009276798B2

(12) United States Patent
Yu et al.

(10) Patent No.: US 9,276,798 B2
(45) Date of Patent: Mar. 1, 2016

(54) NON-RECURSIVE DIGITAL CALIBRATION FOR JOINT-ELIMINATION OF TRANSMITTER AND RECEIVER I/Q IMBALANCES WITH MINIMIZED ADD-ON HARDWARE

(71) Applicant: UNIVERSITY OF MACAU, Taipa, Macau (CN)

(72) Inventors: Wei-Han Yu, Macau (CN); Chak-Fong Cheang, Macau (CN); Ka-Fai Un, Macau (CN); Pui-In Mak, Macau (CN); Rui P. Martins, Macau (CN)

(73) Assignee: UNIVERSITY OF MACAU, Taipa, Macau (CN)

( * ) Notice: Subject to any disclaimer, the term of this patent is extended or adjusted under 35 U.S.C. 154(b) by 0 days.

(21) Appl. No.: 14/226,032

(22) Filed: Mar. 26, 2014

(65) Prior Publication Data
US 2015/0280958 A1 Oct. 1, 2015

(51) Int. Cl.
*H04L 27/36* (2006.01)
(52) U.S. Cl.
CPC .................................. *H04L 27/364* (2013.01)
(58) Field of Classification Search
CPC ........... H04L 27/364; H04L 2027/0016; H04L 2027/0018; H04L 27/3863; H04L 2027/0022; H03C 3/40; H04B 1/30; H04B 17/0062; H04B 17/0012; H04B 17/0015; A61B 18/18; A61B 18/1815; A61B 2017/00725; A61B 2018/00755
See application file for complete search history.

(56) References Cited
U.S. PATENT DOCUMENTS

| 2001/0012770 | A1* | 8/2001 | Pol | H04B 17/20 455/232.1 |
|---|---|---|---|---|
| 2004/0203472 | A1* | 10/2004 | Chien | H04B 1/30 455/68 |
| 2005/0260949 | A1* | 11/2005 | Kiss | H04B 17/21 455/67.14 |
| 2006/0109893 | A1* | 5/2006 | Chen | H04L 27/364 375/219 |
| 2009/0175398 | A1* | 7/2009 | Inanoglu et al. | 375/376 |
| 2010/0020857 | A1* | 1/2010 | Takano | H04B 17/21 375/219 |
| 2011/0075715 | A1* | 3/2011 | Kravitz | 375/221 |
| 2012/0300818 | A1* | 11/2012 | Metreaud et al. | 375/219 |

(Continued)

OTHER PUBLICATIONS

Valkama, M., et al., "A Novel Image Rejection Architecture for Quadrature Radio Receivers," IEEE Trans. on Circuits and Systems II, vol. 51, No. 2, pp. 61-68, Feb. 2004.

(Continued)

*Primary Examiner* — Hirdepal Singh
(74) *Attorney, Agent, or Firm* — Nath, Goldberg & Meyer; Jerald L. Meyer; Stanley N. Protigal

(57) ABSTRACT

A digital calibration circuit is used to provide joint-elimination of transmitter and receiver I/Q imbalances. Digital I and Q quadrature signals are received and converted to analog I and Q quadrature signals on I and Q for transmission on output channels. An output mixer is used to convert the quadrature signals to an unbalanced RF output. An unbalanced RF signal is received selectively either externally or from the RF output using a source follower, and the received signal is mixed to provide analog I and Q quadrature signals, using a local oscillator (LO). The LO adds an additional 90 ° phase shift between I and Q quadrature channels of the unbalanced RF input. Parameter estimating the transmitted digital I and Q quadrature signals and providing estimations of I and Q quadrature imbalance conditions.

6 Claims, 6 Drawing Sheets

(56) References Cited

U.S. PATENT DOCUMENTS

2013/0266045 A1* 10/2013 Lakkis .................... 375/219
2014/0140379 A1* 5/2014 Teplitsky et al. ............ 375/219

OTHER PUBLICATIONS

Kang, B., et al., "Design and Analysis of an Ultra-Wideband Automatic Self-Calibrating Upconverter in 65-nm CMOS," IEEE Trans. on Microw. Theory Tech., vol. 60, No. 7, pp. 2178-2191, Jul. 2012.
Georgiadis, A., "Gain, Phase Imbalance, and Phase Noise Effects on Error Vector Magnitude," IEEE Trans. on Veh. Tech., vol. 53, No. 2, pp. 443-449, Mar. 2004.
Hsieh, Y. H., et al., "An Auto-I/Q Calibrated CMOS Transceiver for 802.11g," IEEE J. Solid-State Circuits, vol. 40, No. 11, pp. 2187-2192, Nov. 2005.
Yu, L., et al., "A Novel Adaptive Mismatch Cancellation System for Quadrature IF Radio Receivers," IEEE Trans. on Circuits and Systems II, vol. 46, No. 6, pp. 789-801, Jun. 1999.
Lee, C. P., et al., "A Highly Linear Direct-Conversion Transmit Mixer Transconductance Stage with Local Oscillation Feedthrough and I/Q Imbalance Cancellation Scheme," in IEEE ISSCC Dig. Tech. Papers, pp. 368-369, Feb. 2006.
Lopelli, E., et al., "A 40nm Wideband Direct-Conversion Transmitter with Sub-Sampling-Based Output Power, LO Feedthrough and I/Q Imbalance Calibration," in IEEE ISSCC Dig. Tech. Papers, pp. 424-426, Feb. 2011.
Anttila, L., et al., "Frequency-Selective I/Q Mismatch Calibration of Wideband Direct-Conversion Transmitters," IEEE Trans. on Circuits and Systems II, vol. 55, No. 4, pp. 359-363, Apr. 2008.
Valkama, M., et al., "Blind I/Q Signal Separation-Based Solutions for Receiver Signal Processing," EURASIP J. on Adv. in Sig. Proc., vol. 2005, No. 16, pp. 2708-2718, 2005.
Andraka, R., "A survey of CORDIC algorithms for FPGA based computers", Proc. ACM/SIGDA Conf., pp. 191-200, 1998.
Elahi, I., et al., "Parallel Correction and Adaptation Engines for I/Q Mismatch Compensation," IEEE Trans. on Circuits and Systems II, vol. 56, No. 1, pp. 86-90, Jan. 2009.
Cavers, J. K., et al., "Adaptive compensation for imbalance and offset losses in direct conversion transceivers," IEEE Trans. on Veh. Tech., vol. 42, No. 4, pp. 581-588, Nov. 1993.

* cited by examiner

NON-RECURSIVE DIGITAL CALIBRATION FOR JOINT-ELIMINATION OF TRANSMITTER AND RECEIVER I/Q IMBALANCES WITH MINIMIZED ADD-ON HARDWARE

BACKGROUND

1. Field

The present disclosure relates to digital calibration of transmitters and receivers of quadrature modulated signals, implemented using an internally switched signal path. Keywords include algorithm, CORDIC, calibration, I/Q imbalance, local oscillator (LO), transceiver, transmitter (TX) and receiver (RX).

2. Background

Quadrature modulation is fundamental in nearly all wireless transceivers for its high spectral efficiency, but mismatches of components and physical layout generally leads to gain and phase mismatches between the I and Q quadrature signals. The resultant image effect can significantly degrade the error vector magnitude (EVM), especially for very dense signal constellations such as 16-QAM and 64-QAM. Since I/Q imbalances can happen in the receiver (RX), transmitter (TX) and local oscillator (LO), the desired calibration algorithm should be able to correct the I/Q imbalances with minimum add-on hardware for better cost and area efficiencies.

A number of techniques have been reported to deal with the I/Q imbalance problem. Examples are the loop-back detector with a recursive algorithm, two-dimensional iterative search algorithm, and blind estimation algorithm. The first two are demanding in hardware and computation, inducing a long calibration time and are power and area hungry in their implementation. For the third, although no training sequence is entailed, the estimation process still involves heavy computation (e.g., inverse matrix) and can suffer from the instability issue in the recursive loop.

SUMMARY

Digital calibration circuit for joint-elimination of transmitter and receiver I/Q imbalances is performed by using a feedback circuit and a joint estimation circuit to provide I/Q parameters estimation. I and Q quadrature signals are received and analog I and Q quadrature signals are transmitted on I and Q output channels. Output mixing is performed to convert the quadrature signals to an unbalanced RF output. An unbalanced RF input is received and mixed to provide analog I and Q quadrature signals, and analog to digital conversion is performed on the I and Q quadrature signals. A source follower amplifier is selectively connected between the unbalanced RF output with the unbalanced RF input, establishing a feedback loop from the unbalanced RF output through the source follower amplifier to the unbalanced RF input. A local oscillator (LO) is used to provide an LO signal to the output and input mixer circuit, and the LO adds an additional 90° phase shift between I and Q quadrature channels of the unbalanced RF input. Parameter estimation is performed on the received digital I and Q quadrature signals and is used for providing estimations of I and Q quadrature imbalance conditions.

DETAILED DESCRIPTION

Overview

A non-recursive digital calibration technique, namely local oscillator (LO) switching, is provided for jointly eliminating the transmitter (TX) and receiver (RX) I/Q imbalances of quadrature signals, in one combined process. The digital calibration technique provides joint correction of RX and TX I/Q imbalances under a reference LO, using add-on analog parts limited to a set of source followers and MOS switches. The latter is to employ the 90° phase shift property of the LO available in most quadrature transceivers, generating adequate conditions to estimate the I/Q imbalance parameters non-recursively. An experimental verification is described, as a non-limiting example, based on a 65 nm CMOS transceiver chip co-designed with a CORDIC algorithm implemented in the FPGA.

The add-on analog parts are limited to a set of source followers (0.00228 mm$^2$), and MOS switches (0.00017 mm$^2$) for reusing the 90° phase shift property of the reference LO, avoiding the sinusoidal test tone, loop-back detector, high-speed analog-to-digital converter and 2-dimensional iterative search algorithm, mostly required in the prior art. A 65 nm CMOS transceiver, co-designed with a FPGA-based CORDIC algorithm, measures a 10 dB improvement of image rejection ratio (IRR) for both TX (27.8→37.2 dB) and RX (31.2→42 dB). The required digital circuitry for the algorithm is also assessed and simulated.

Transceiver-FPGA System Co-Design

Figure 1:
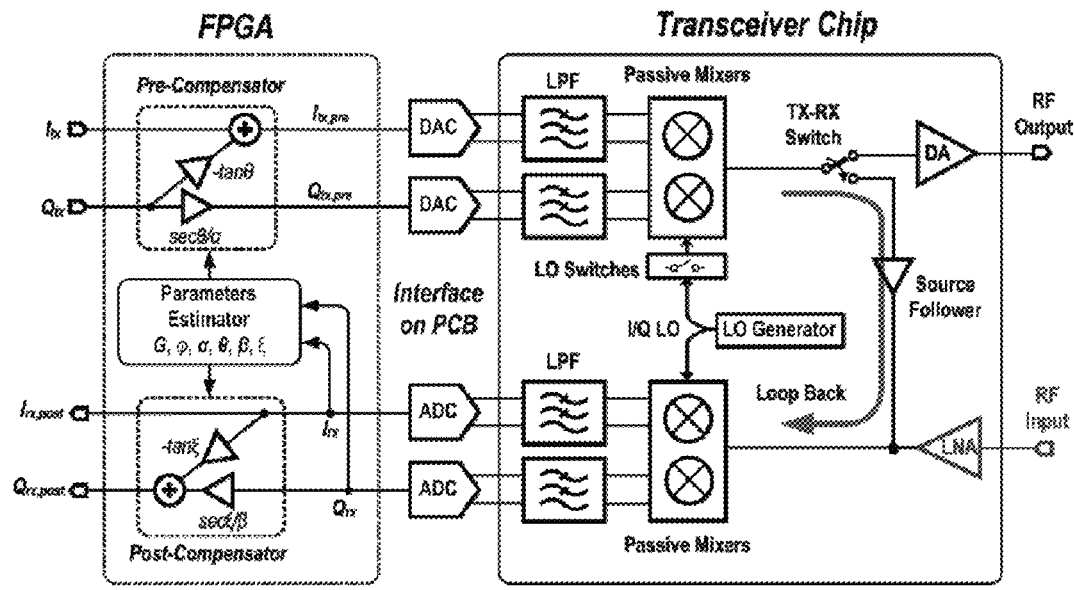
FIG. 1 is a schematic block diagram of a system configured to provide non-recursive digital calibration, in which the calibration provides joint elimination of transmitter and receiver I/Q imbalances of quadrature signals.

FIG. 1 is a schematic block diagram of a system configured to provide non-recursive digital calibration, in which the calibration provides joint-elimination of transmitter and receiver I/Q imbalances of quadrature signals. In the calibration mode, the RF output from the TX mixers is looped back to the RX via the TX-RX switch, such that the calibration process can be moved to the digital domain, reusing the existing hardware, while, more importantly, linking up together the I/Q imbalances of both RX and TX for joint calibration. The integrated TX includes two first-order passive RC lowpass filters (LPFs) for reconstructing the I and Q quadrature inputs generated by the off-chip digital-to-analog converters (DACs). After I/Q up-conversion by the passive mixers, a single-ended class B driver amplifier (DA) with an inductive load delivers the RF output for 50 Ω measurements.

By focusing on the calibration mode, the on-chip RX path is able to provide a simplified approach to rapid prototyping. In the baseband, only first-order active RC LPFs are employed to suppress the image at 2×LO frequency generated by the TX, which is already adequate to minimize the calibration error due to aliasing in the analog-to-digital converters (ADCs).

Typical direct-conversion transmitters using sub-sampling for imbalance calibration require a high-speed sub-sampling ADC, for example 200 MHz, to serve as the loop-back RX. In contrast, the disclosed technology simply reuses the existing RX mixers, LPFs, and ADCs that are much more relaxed in terms of speed. By way of non-limiting example, the sub-sampling ADC speed is 80 MHz. The source follower provides isolation between the passive mixers on the TX and RX sides. The low-noise amplifier (LNA) was not integrated the focus is on the I/Q imbalance calibration.

Figure 2:
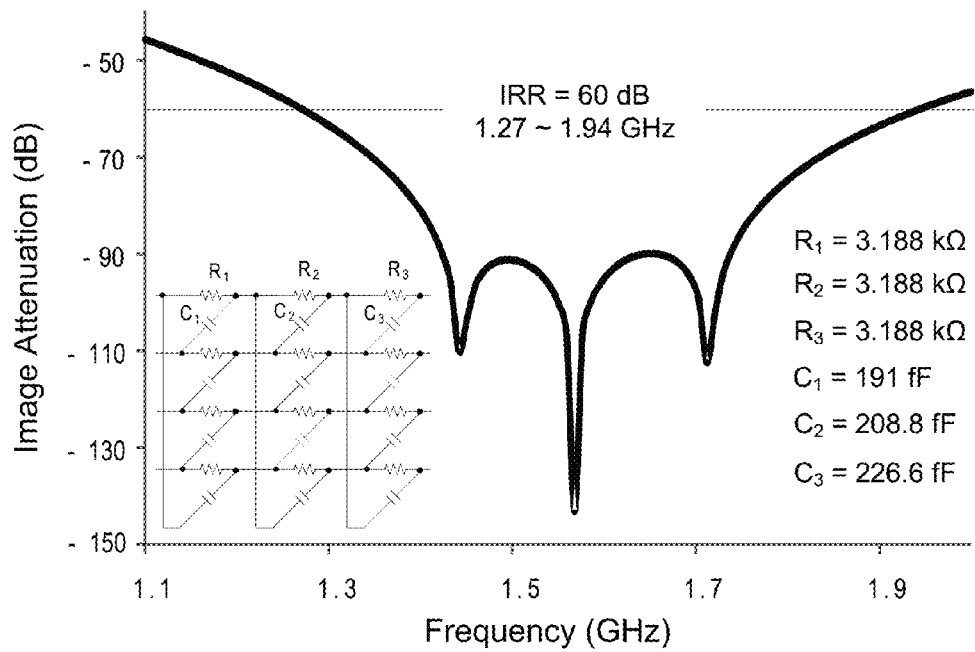
FIG. 2 is a graphical diagram showing signal response in terms of image attenuation vs. frequency to provide image rejection over a broad spectrum.

FIG. 2 is a graphical diagram showing signal response in terms of image attenuation vs. frequency to provide image rejection over a broad spectrum. The disclosed I/Q imbalance calibration employs the LO as the reference such that joint calibration of RX and TX can be achieved. Thus, the I/Q accuracy of the LO is crucial and must be robust over process variations. Here, the LO path is led by an active balun implemented with a cascaded differential amplifier, and followed by a RC-CR network as the polyphase filter (PPF) for 4-phase (0°, 90°, 180°, 270°) sine LO generation at ~1.4 GHz (a frequency convenient for this design). As shown in FIG. 2 from simulations, for an image-rejection ratio (IRR) of 60 dB, a 3-stage RC-CR network with properly positioned poles is adequate to cover a broad spectrum (1.27 to 1.94 GHz), such that the worst RC variations can still be tolerated.

At the circuit level, before driving the 4-phase LO to the I/Q passive mixers, logic operation is applied to transform them from sine LO into a set of 25% duty-cycle square LO with guard intervals, avoiding I/Q crosstalk, while saturating the LO amplitude to improve the gain balancing.

Field Programmable Gate Array (FPGA)

The left side of FIG. 1 shows a field programmable gate array (FPGA) used to implement pre-compensation and post-compensation. For the TX digital baseband, the imbalanced baseband output can be modeled as $x_{tx,imb}(t)=I_{tx,imb}+jQ_{tx,imb}$, such that $$\begin{bmatrix} I_{tx,imb} \\ Q_{tx,imb} \end{bmatrix} = \begin{bmatrix} 1 & \alpha\sin\theta \\ 0 & \alpha\cos\theta \end{bmatrix} \begin{bmatrix} I_{tx} \\ Q_{tx} \end{bmatrix} \quad (1)$$

where the gain and phase imbalances are represented by $\alpha$ and $\theta$, respectively. Similarly, for the RX, the imbalanced baseband output is given by, $$\begin{bmatrix} I_{rx,imb} \\ Q_{rx,imb} \end{bmatrix} = \begin{bmatrix} 1 & 0 \\ \beta\sin\xi & \beta\cos\xi \end{bmatrix} \begin{bmatrix} I_{rx,ideal} \\ Q_{rx,ideal} \end{bmatrix} \quad (2)$$

where the gain and phase imbalances are represented by $\beta$ and $\xi$, respectively. $I_{rx,ideal}$ and $Q_{rx,ideal}$ refer to the down-converted output with an ideal RF input with no I/Q imbalance.

Such an RF model is used as the basis for the following estimation process. With a reference LO mixed with the digital baseband signals, we obtain the RF signal as, $$s_{RF}=(I_{tx}+\alpha \sin \theta Q_{tx})\cos \omega t + \alpha \cos \theta Q_{tx} \sin \omega t \quad (3)$$

The pre-compensation of TX and the post-compensation of RX are operated by inversing directly the baseband system model between the TX and RX, in which both matrixes can be represented as, Compensation for TX:

$$\begin{bmatrix} I_{tx,pre} \\ Q_{tx,pre} \end{bmatrix} = \begin{bmatrix} 1 & -\tan\theta \\ 0 & \sec\theta/\alpha \end{bmatrix} \begin{bmatrix} I_{tx} \\ Q_{tx} \end{bmatrix} \quad (4)$$

Compensation for RX:

$$\begin{bmatrix} I_{rx,post} \\ Q_{rx,post} \end{bmatrix} = \begin{bmatrix} 1 & 0 \\ -\tan\xi & \sec\xi/\beta \end{bmatrix} \begin{bmatrix} I_{rx} \\ Q_{rx} \end{bmatrix} \quad (5)$$

LO Switching I/O Imbalance Calibration

Figure 3A:
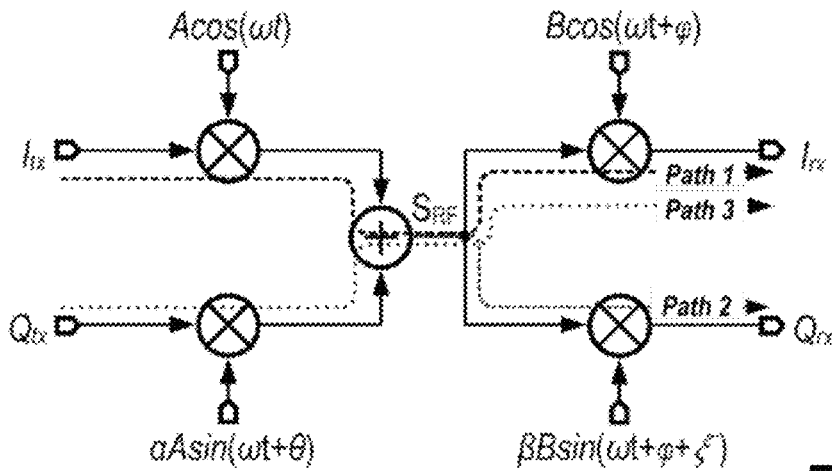
FIGS. 3A and 3B are schematic diagrams showing I/Q imbalance at 0 phase shift (FIG. 3A) and 90° phase shift (FIG. 3B).
Figure 3B:
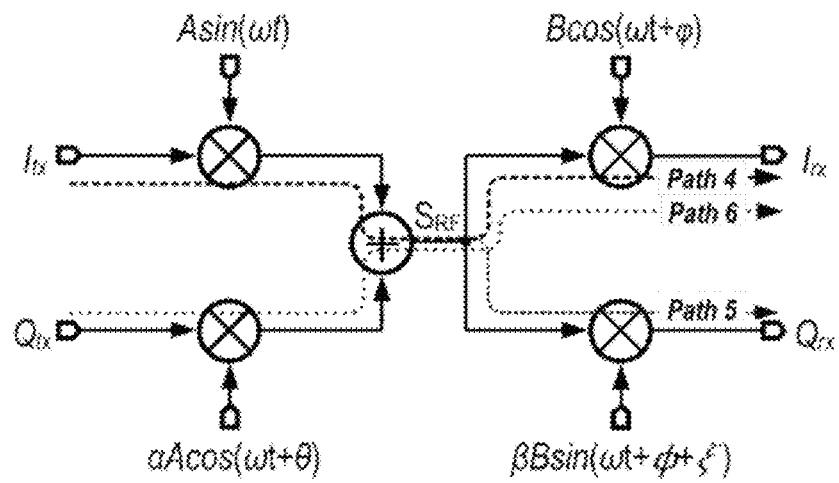

FIGS. 3A and 3B are schematic diagrams showing how the I/Q imbalance parameters can be extracted. With the I/Q imbalance model is shown in FIG. 3A, the overall gains of the TX and RX are denoted as A and B, respectively, and the overall phase shift passing through them is denoted as $\phi$. The outputs for the TX baseband are $I_{tx}$ and $Q_{tx}$ and the inputs for the RX baseband are $I_{rx}$ and $Q_{rx}$. As shown in FIG. 3A, if a DC training signal is sent from $I_{tx}$ and $Q_{tx}$ separately into the system, only four equations are available to estimate the wanted I/Q imbalance parameters. Consequently, only the conventional Least Mean Square (LMS) method can be applied, which is slow and has a limited accuracy. The LO switching technique presented here has the objective of finding more independent equations. The procedure is two-fold: 1) transmit a DC training signal from $I_{tx}$ and $Q_{tx}$ to the system, and 2) switch the LO can generate an extra 90° phase shift between the two input channels, offering more equations to solve the desired I/Q imbalance parameters. Specifically, if a DC training signal with amplitude c at $I_{tx}$ and $Q_{tx}$ is separately injected into the I/Q imbalance model, the output signals can be represented as, The Output Signal Through Path 1, $$I_{rs,Path1} = LPF\{cA\cos(\omega t)B\cos(\omega t + \phi)\} = \frac{cAB}{2}\cos\phi \quad (6)$$

The Output Signal Through Path 2, $$Q_{rs,Path2} = LPF\{cA\cos(\omega t)\beta B\sin(\omega t + \phi + \xi)\} = \frac{cAB}{2}\sin(\phi + \xi) \quad (7)$$

The Output Signal Through Path 3, $$I_{rx,Path3} = LPF\{c\alpha A\sin(\omega t + \theta)B\sin(\omega t + \phi)\} = \frac{c\alpha AB}{2}\sin(\theta - \phi) \quad (8)$$

Then, considering FIG. 3B, the phase of the LO is switched for a phase shift of 90°. In this case, if we transmit a DC training signal at $I_{tx}$ and $Q_{tx}$, the output signals can be represented as, The Output Signal Through Path 4, $$I_{rx,Path4} = LPF\{cA\sin(\omega t)B\cos(\omega t + \phi)\} = \frac{cAB}{2}\sin\phi \quad (9)$$

The Output Signal Through Path 5, $$Q_{rx,Path5} = LPF\{cA\sin(\omega t)\beta B\sin(\omega t + \phi + \xi)\} = \frac{c\beta AB}{2}\sin(\phi + \xi) \quad (0)$$

The Output Signal Through Path 6, $$I_{rx,Path6} = LPF\{c\alpha A\cos(\omega t + \theta)B\cos(\omega t + \phi)\} = \frac{c\alpha AB}{2}\cos(\theta - \phi) \quad (11)$$

Thus, the overall gain G=AB/2, and the overall phase shift φ can be computed as, $$G = \sqrt{(I_{rx,Path3}/c)^2 + (I_{rx,Path4}/c)^2}, \quad (12)$$

$$\phi = \tan^{-1}(I_{rx,Path4}/I_{rx,Path1}) \quad (13)$$

Finally, the gain and phase mismatches of the TX and RX are solved, leading to, $$\alpha = G^{-1}\sqrt{(I_{rx,Path6}/c)^2 + (I_{rx,Path3}/c)^2}, \quad (14)$$

$$\theta = \tan^{-1}(I_{rx,Path3}/I_{rx,Path6}) + \phi \quad (15)$$

$$\beta = G^{-1}\sqrt{(Q_{rx,Path2}/c)^2 + (Q_{rx,Path5}/c)^2}, \quad (16)$$

$$\xi = \tan^{-1}(Q_{rx,Path2}/Q_{rx,Path5}) - \phi \quad (17)$$

The feasibility of the above algorithm can be limited by 1) the numerical estimation accuracy, and 2) the LO's gain and phase errors. For the former, Verilog simulations show a maximum gain error of $8 \times 10^{-4}$ and phase error of ±0.1° in number estimation under 105 time runs, which correspond to an IRR of 65 dB. Thus, the former should not be the limiting factor for most transceivers.

Figure 4:
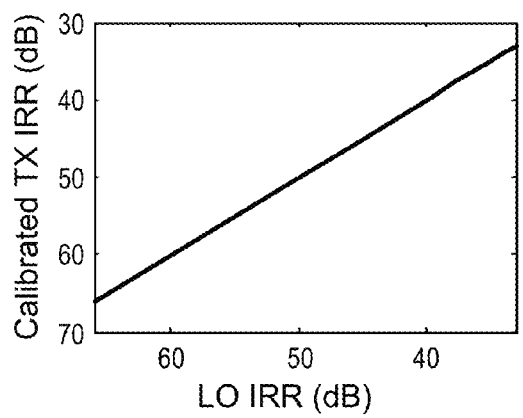
FIG. 4 is a graphical diagram showing calibrated transmission image-rejection ratio (IRR) as a function of LO IRR.

FIG. 4 is a graphical diagram showing calibrated transmission image-rejection ratio (IRR) as a function of LO IRR. For the LO's gain and phase errors, we can consider a non-ideal LO as, LO=$\gamma e^{(j\omega t+\eta)}$, where γ(η) denotes the LO gain error, mostly appearing as phase error. The achievable IRR in the TX with respect to that of the LO is plotted in FIG. 4. They are linearly related. Thus, for an IRR of 60 dB in the LO (FIG. 2), the IRR of the TX and RX should only be limited by themselves.

Measurement Results

Figure 5:
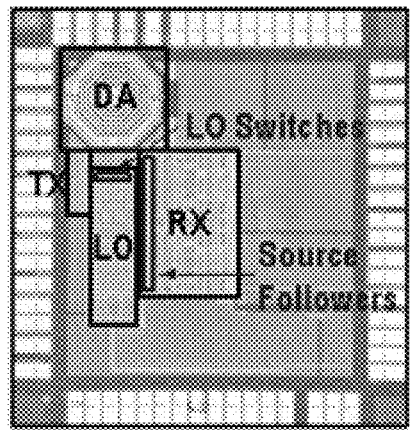
FIG. 5 is a topography layout diagram superimposed over a chip micrograph, showing approximations of the layout locations of circuit components according to the disclosure.

A transceiver chip and test setup is shown in FIG. 5. FIG. 5 is a topography layout diagram superimposed over a chip micrograph, showing approximations of the layout locations of circuit components according to the disclosure. The transceiver was fabricated in a 65 nm CMOS process. The active die area is 0.82×0 mm², of which only 0.00245 mm² is due to the LO switches and source followers added to assist the calibration.

Figure 6:
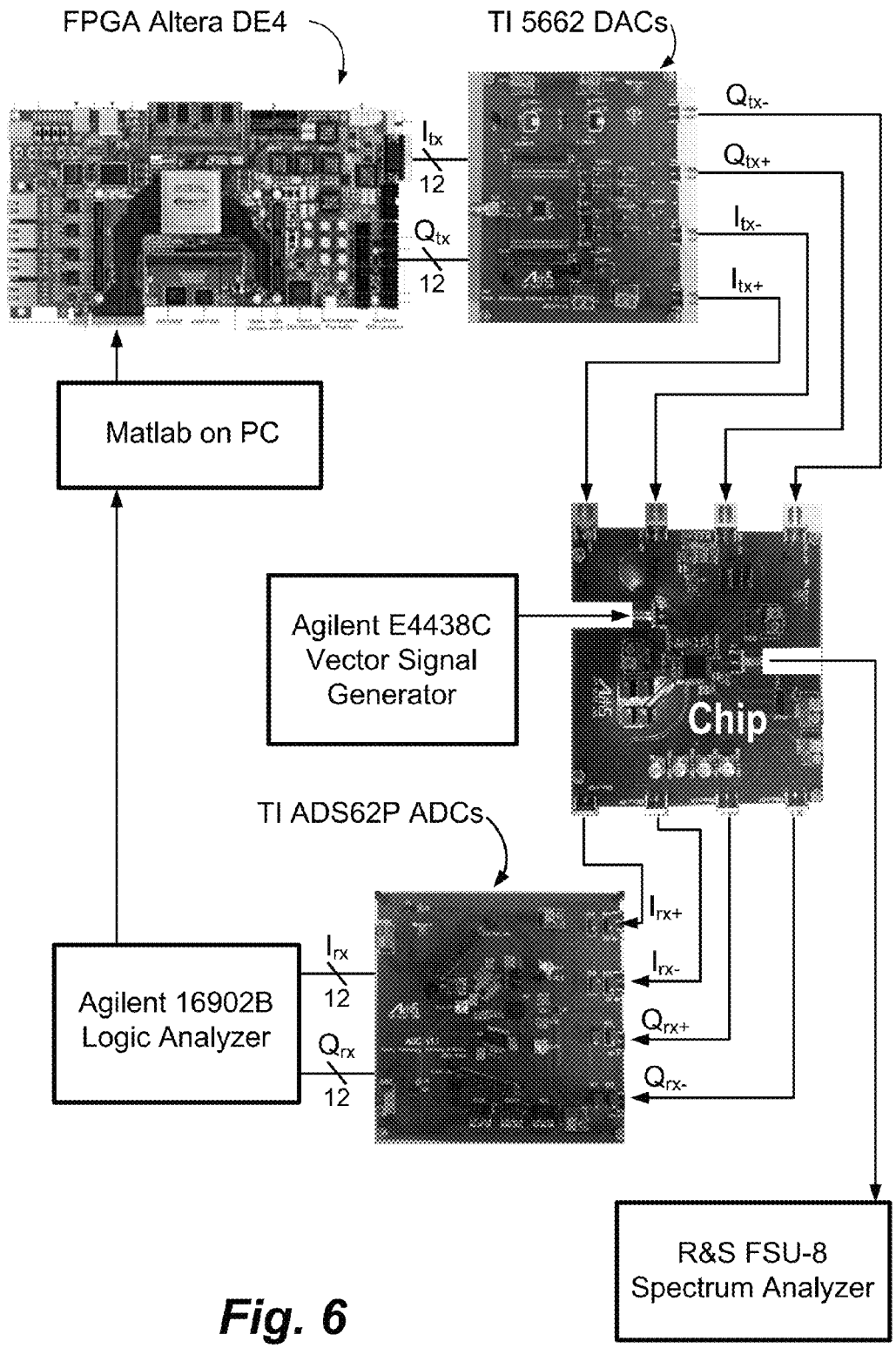
FIG. 6 is a schematic block diagram showing an experimental setup for testing the disclosed circuitry.

FIG. 6 is a schematic block diagram showing an experimental setup for testing the disclosed circuitry. The baseband I/Q signals are generated by the ALTERA DE4 FPGA. It interfaces with the RX and TX through the Texas Instrument DACs (5662) and ADCs (ADS62P23). Both have a 12-bit resolution and a 80 MHz conversion rate. The master clock is generated by the FPGA for synchronization. All RF and LO switches are driven by the FPGA through digital level shifters downscaling the control signal from 3.3 to 1.2 V befitting the employed 65 nm CMOS devices. The output signal from the DA is measured by the R&S FSU-8 spectrum analyzer for the single tone test. The digital outputs from the FPGA are captured by the Agilent 16902B logic analyzer for the RX post-compensation test.

Algorithm Implemented in the FPGA and Simulated in ASIC

Figure 7:
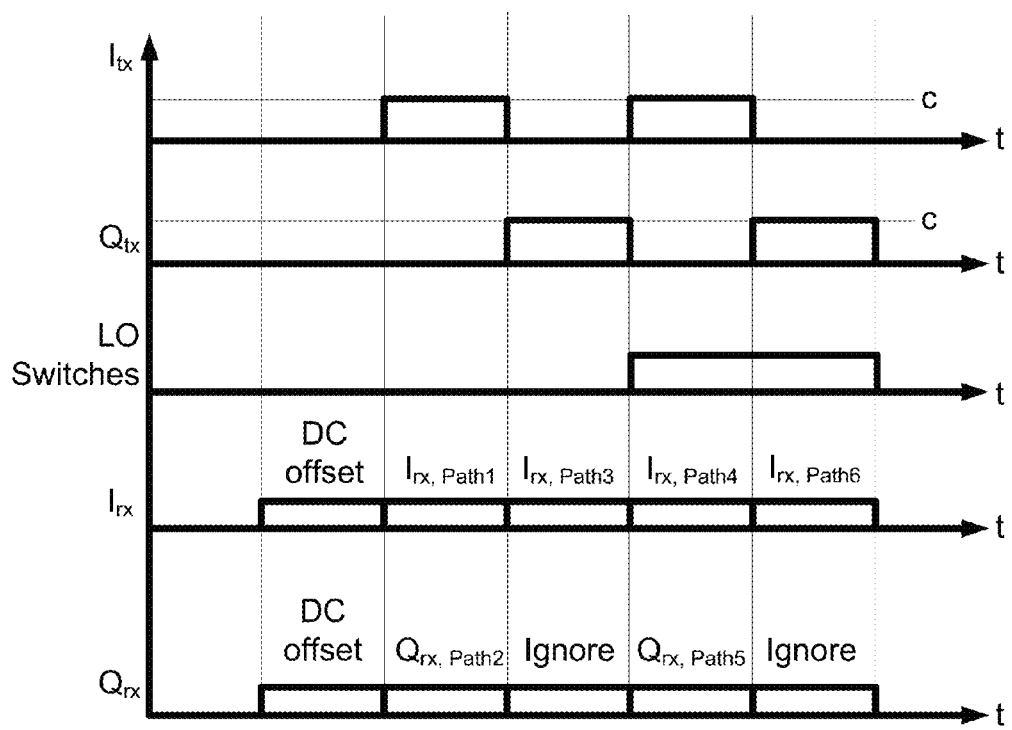
FIG. 7 is a time diagram of the data picking process.

FIG. 7 is a time diagram of the data picking process. The pre-read phase learns the DC offsets. A DC signal with an amplitude c (~0.2 V, to uphold the linearity) is then transmitted at $I_{tx}$ to obtain $I_{rx}$ and $Q_{rx}$. Afterwards, the transmit data is exchanged, i.e., $I_{tx}$=0 and $Q_{tx}$=c to obtain $I_{rx}$, where $Q_{rx}$ is ignored. The process is repeated once after creating the 90° phase shift via LO switching. After the data collection, the I/Q imbalance parameters can be computed in the FPGA.

The computation employs a CORDIC algorithm. CORDIC (for COordinate Rotation DIgital Computer), also known as the digit-by-digit method and Volder's algorithm, is a simple and efficient algorithm to calculate hyperbolic and trigonometric functions. The CORDIC algorithm can be used when no hardware multiplier is available. The CORDIC algorithm is able to be implemented through simple microcontrollers and FPGAs because the only operations it requires are addition, subtraction, bit shift and table lookup. By way of non-limiting example, only shift bits and adders in the entire computation, rendering it very power and area efficient. For example, after picking $I_{rx,Path1}$ and $I_{rx,Path4}$, Equations. (12) and (13) can be solved by the CORDIC after 25 clock cycles under a 100 MHz clock rate. Since there are 3 sets of equations, 75 clock cycles are entailed totally. There is 1 more clock cycle for the computation of the parameters in Equations. (4) and (5).

The algorithm is also converted into a 65 nm CMOS ASIC under the Cadence Encounter™, the required power, area and calibration time are estimated, as summarized in Table I. The simulated digital power during compensation is 366.55 μW and the entire calibration process takes 760 ns and consumes 206 pJ of energy to complete at a 100 MHz clock rate. The entailed digital area is ~0.02 mm²:

TABLE I

Power Consumption and Area simulated with Standard 65 nm CMOS Process at 1.1 V and 25° C.

| FPGA Operation | Algorithm | Number of Operators Used | Power Leakage (nW) | Power Switching (nW) | No. of Gate | Area ($\mu m^2$) | No. of Clock Cycle |
|---|---|---|---|---|---|---|---|
| Parameter Estimator | CORDIC | 1 | 55282.87 | 214631.06 | 2104 | 8107.32 | 25 × 3 |
| Compensator | Secant | 2 | 12209.07 | 62558.95 | 241 | 1055.6 | 1 |
| | Division | 2 | 19533.42 | 73553.22 | 421 | 1597.44 | 9 |
| | Multiplication | 4 | 22362.89 | 68595.1 | 371 | 1714.44 | 1 |
| | Addition | 2 | 1814.31 | 9544.43 | 36 | 149.76 | 1 |

IRR Before and after Calibration

Figure 8A:
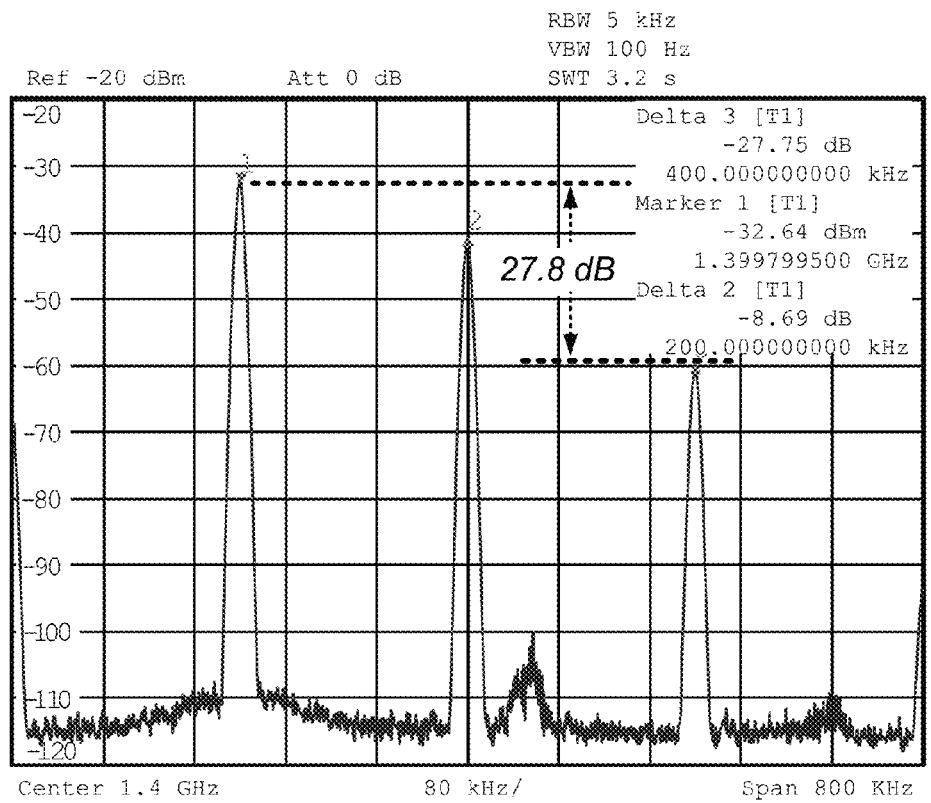
FIGS. 8A and 8B are graphical diagrams showing the TX output spectrums for a single tone test before and after calibration, respectively.
Figure 8B:
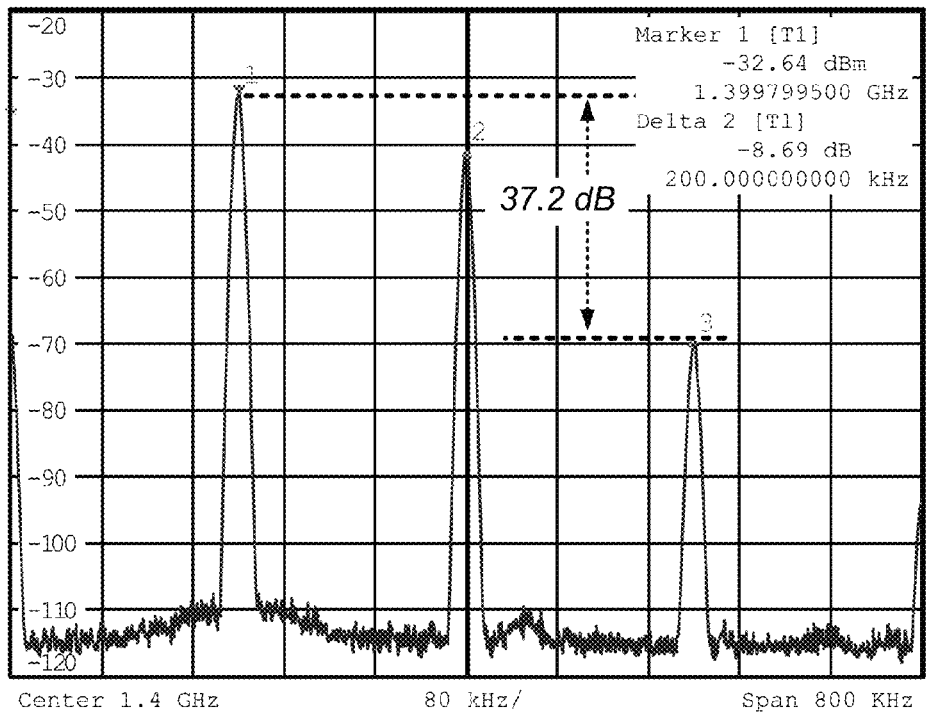

FIGS. 8A and 8B are graphical diagrams showing the TX output spectrums for a single tone test before and after calibration, respectively. The IRR is improved from 27.8 to 37.5 dB. The calculated I/Q imbalance parameters are shown in Table II:

TABLE II

Calculated I/Q Imbalance Parameters.

| G | $\phi$ | $\alpha$ | $\theta$ | $\beta$ | $\xi$ |
|---|---|---|---|---|---|
| 0.3055 | 44.7003° | 1.0281 | −3.2828° | 1.0823 | 1.9306° |

Figure 9A:
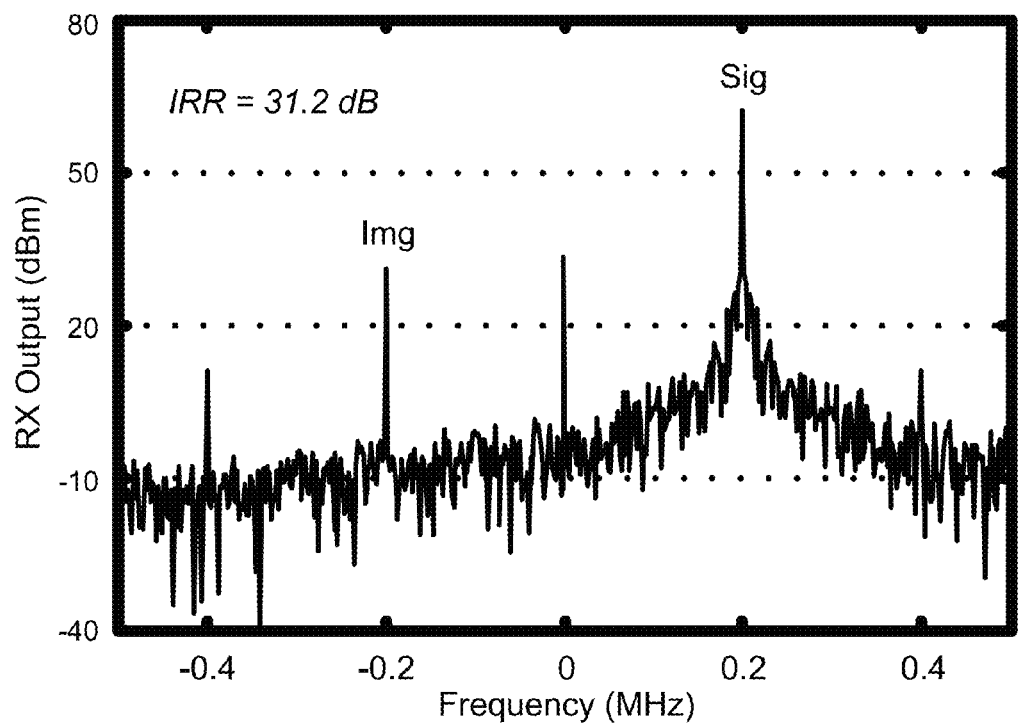
FIGS. 9A and 9B are graphical displays of received output (RX) as a function of frequency before (FIG. 9A) and after (FIG. 9B) post-compensation, respectively.
Figure 9B:
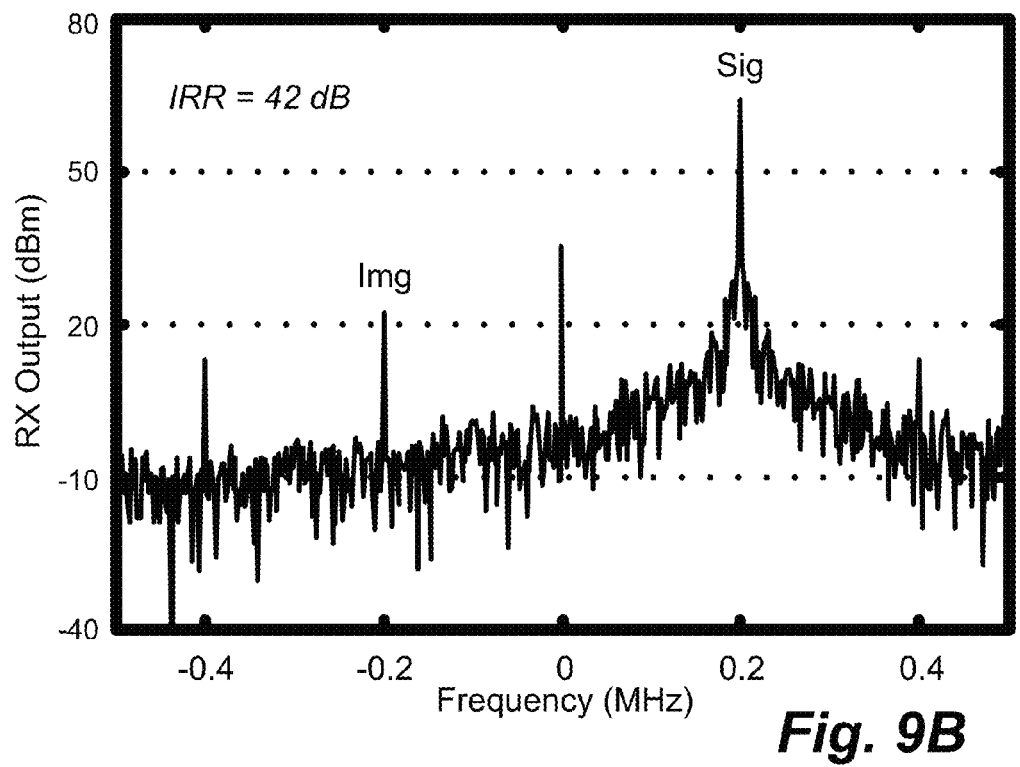

FIGS. 9A and 9B are graphical displays of received output (RX) as a function of frequency before (FIG. 9A) and after (FIG. 9B) post-compensation, respectively. While the results depicted in FIGS. 9A and 9B are similar, it is noted that on negative (left) side, there are differences in the peaks, for example the Img peak as compared to the 0-offset peak (center). The IRR is improved from 31.2 to 42 dB. For a 64-QAM OFDM signal, these results correspond to 4% improvement of EVM from 6% to 2% for the TX, and 2.86% improvement of EVM from 3.84% to 0.98% for the RX.

For wideband applications, the disclosed method can be extended using different sets of I/Q imbalance parameters trained under a number of selected frequencies in the baseband bandwidth. A preliminary study shows that it was desirable to add a digital baseband detector, and that it was desirable to use a Finite Impulse Response (FIR) filter as the compensator.

D. Architectural Comparison

The measurement summary is given in Table III. The add-on analog area is extremely small (0.00245 mm$^2$) as most circuitry are reused between the TX and RX:

TABLE III

Chip Summary.

| Technology | 65 nm CMOS |
|---|---|
| Transceiver Chip Area | 0.41 mm$^2$ |
| Analog Area for Calibration | 0.00245 mm$^2$ |
| Operation Frequency | 1.4 GHz |
| Power Consumption  RX Path | 18 mW |
| LO Generator | 22 mW |
| DA | 20 mW |
| TX IRR Before and after Calibration | 27.8 dB → 37.2 dB |
| RX IRR Before and after Calibration | 31.2 dB → 42 dB |

As the hardware between the presently disclosed technology and prior art techniques can be very different, they should not be directly compared. Nevertheless, a summary of their features is shown in Table IV:

TABLE IV

Comparison with the State-of-the-Art.

| | 2-D Search | Sine Test Tone | Dedicated Detector | High Speed ADC | TX IRR Improved | RX IRR Improved |
|---|---|---|---|---|---|---|
| present disclosure | x | x | x | x | 10 dB | 10 dB |
| auto-I/Q calibrated CMOS transceiver[1] | ✓ | ✓ | ✓ | x | 12 dB | 12 dB |
| direct-conversion transmit mixer with lo feedthrough and I/Q imbalance cancellation[2] | ✓ | ✓ | ✓ | x | 15.6 dB | No |
| wideband direct-conversion transmitter with sub-sampling-based output power[3] | ✓ | ✓ | x | ✓ | 24 dB | No |

Descriptions of the transceivers used in the comparison are:

[1] Y. H. Hsieh, W. Y. Hu, S. -M. Lin, et al., "An Auto-I/Q Calibrated CMOS Transceiver for 802.11g," IEEE J. Solid-State Circuits, vol. 40, no. 11, pp. 2187-2192, November 2005.
[2] C. P. Lee, A. Behzad, D. Ojo, et al., "A Highly Linear Direct-Conversion Transmit Mixer Transconductance Stage with Local Oscillation Feedthrough and I/Q Imbalance Cancellation Scheme," in IEEE ISSCC Dig. Tech. Papers, pp. 368-369, February 2006.
[3] E. Lopelli, S. Spiridon, J. van der Tang, "A 40 nm Wideband Direct-Conversion Transmitter with Sub-Sampling-Based Output Power, LO Feedthrough and I/Q Imbalance Calibration," in IEEE ISSCC Dig. Tech. Papers, pp. 424-426, February 2011.

One advantage of the present technique is the ability to jointly calibrate the TX and RX. Although the achieved 37.2 to 42 dB IRR are suboptimal, this work exhibits attractive advantages such as non-recursive operation, joint-calibration capability of TX and RX in one combined process, and low requirement on the analog and digital parts. Indeed, the achieved IRR is fairly adequate for many wireless applications, but should be improvable when implementing in a monolithic ASIC.

Conclusion

A non-recursive digital calibration technique for joint elimination of TX-RX I/Q imbalances has been described. The only add-on analog hardware are a set of source followers and MOS switches for generating an extra 90° phase shift in the reference LO which is shared among the TX and RX. The I/Q accuracy of the LO is optimized at the circuit level via employing a 3-stage RC-CR network to achieve adequate I/Q accuracy over process variations. This work avoids the sinusoidal test tone, loop-back detector, high-speed ADC and 2-dimensional recursive search algorithm that were commonly required in the prior art. A 65 nm CMOS transceiver prototype co-designed with a FPGA-implemented algorithm shows a 10 dB improvement of IRR for both TX and RX in one combined process.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A Digital calibration circuit for joint-elimination of transmitter and receiver I/Q imbalances, comprising:
    a circuit receiving digital I and Q quadrature signals, said circuit comprising digital to analog converters receiving digital I and Q quadrature signals and transmitting analog I and Q quadrature signals on I and Q output channels;
    an initial output pre-compensation circuit providing digital I and Q quadrature signals to the circuit receiving the digital I and Q quadrature signals, and providing pre-compensation for the digital I and Q quadrature signals;
    an output mixer circuit converting the quadrature signals to an unbalanced RF output;
    the I and Q output channels further comprising a first pair of low pass filters between the digital to analog converters receiving digital I and Q quadrature signals and the output mixer circuit;
    a circuit receiving a signal as the unbalanced RF input;
    an input mixer circuit converting the received unbalanced RF input to analog I and Q quadrature signals;
    a circuit transmitting digital I and Q quadrature signals comprising analog to digital converters and a second pair of low pass filters between the input mixer circuit and the analog to digital converters, the circuit receiving analog I and Q quadrature signals from the input mixer circuit;
    a source follower amplifier connecting the unbalanced RF output with the unbalanced RF input;
    a source follower switch selectively connecting the unbalanced RF output to unbalanced RF input, establishing a feedback loop from the unbalanced RF output through the source follower amplifier to the unbalanced RF input;
    a local oscillator (LO) switchable to provide an LO signal to the output and input mixer circuits, wherein the LO adds an additional 90° phase shift between I and Q quadrature channels of the unbalanced RF input;
    a parameters estimator receiving the transmitted digital I and Q quadrature signals and providing estimations of I and Q quadrature imbalance conditions and providing a signal to the initial output pre-compensation circuit to balance I and Q components of the unbalanced RF output and further providing a signal to an input post-compensation circuit to balance the I and Q components of the compensated I and Q signals; and
    the input post-compensation circuit receiving the digital I and Q quadrature signals from the analog to digital converters and providing compensated I and Q signals.

2. The digital calibration circuit as described in claim 1, wherein the input mixer circuit and output mixer circuits comprise passive mixers.

3. The digital calibration circuit as described in claim 1, wherein the source follower switch selectively connecting the unbalanced RF output to unbalanced RF input, establishes a feedback loop from the unbalanced RF output through the source follower amplifier to the unbalanced RF input, reducing the loading effect between the receiver and transmitter during the calibration, allowing the use of simple TX-RX switch to provide the mode switching as the source follower provide a high-input impedance, and permits configuration of the source follower having low output impedance and is linear and wideband enough to provide a replication of the transmitter signal to the receiver.

4. A method for providing digital calibration for joint-elimination of transmitter and receiver I/Q imbalances, the method comprising:
    providing initial output pre-compensation applied to the digital I and Q quadrature signals;
    converting the digital I and Q quadrature signals to analog I and Q quadrature signals;
    mixing the analog I and Q quadrature signals to convert the quadrature signals to an unbalanced RF output;
    using a first pair of low pass filters on I and Q output channels prior to mixing the analog I and Q quadrature signals to convert the quadrature signals to the unbalanced RF output;
    receiving a signal as the unbalanced RF input;
    mixing the received unbalanced RF input signal to convert the unbalanced RF input signal to analog I and Q quadrature signals, using a second pair of low pass filters on I and Q input channels after mixing the received unbalanced RF input signal to convert the unbalanced RF input signal to analog I and Q quadrature signals;
    converting the analog I and Q quadrature signals to digital I and Q quadrature signals;
    using a source follower amplifier to selectively connect the unbalanced RF output with the unbalanced RF input, thereby establishing a feedback loop from the unbalanced RF output through the source follower amplifier to the unbalanced RF input;
    providing a local oscillator (LO) signal for the mixing the analog I and Q quadrature signals and the mixing the received unbalanced RF signal, or the selectively connected unbalanced RF output from the source follower amplifier, wherein the LO adds an additional 90° phase shift between I and Q quadrature channels of the unbalanced RF input;
    providing parameters estimation on received and transmitted digital I and Q quadrature signals to provide estimations of I and Q quadrature imbalance conditions and to provide a signal for the initial output pre-compensation circuit to balance I and Q components of the unbalanced RF output; and using the parameter estimation to apply input post-compensation to the received digital I and Q quadrature signals to provide compensated I and Q signals, the parameters estimation further provided as post-compensation input to balance the I and Q components of the compensated I and Q signals.

5. The method of claim 4, further comprising mixing the analog I and Q quadrature signals to convert the quadrature signals to an unbalanced RF output using passive mixers, and mixing the received unbalanced RF input signal to convert the unbalanced RF input signal to analog I and Q quadrature signals using passive mixers.

6. The method of claim 4, further comprising, wherein the source follower switch selectively connecting the unbalanced RF output to unbalanced RF input, establishes a feedback loop from the unbalanced RF output through the source follower amplifier to the unbalanced RF input, reducing the loading effect between the receiver and transmitter during the calibration, allowing the use of simple TX-RX switch to provide the mode switching as the source follower provide a high-input impedance, and permits configuration of the source follower having low output impedance and is linear and wideband enough to provide a replication of the transmitter signal to the receiver.

* * * * *